(12) United States Patent
Walters et al.

(10) Patent No.: US 12,260,424 B2
(45) Date of Patent: *Mar. 25, 2025

(54) TECHNIQUES TO PREDICT AND IMPLEMENT AN AMORTIZED BILL PAYMENT SYSTEM

(71) Applicant: Capital One Services, LLC, McLean, VA (US)

(72) Inventors: Austin Grant Walters, Savoy, IL (US); Vincent Pham, Champaign, IL (US); Reza Farivar, Champaign, IL (US); Jeremy Edward Goodsitt, Champaign, IL (US)

(73) Assignee: Capital One Services, LLC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,949

(22) Filed: Jul. 6, 2023

(65) Prior Publication Data

US 2023/0351426 A1 Nov. 2, 2023

Related U.S. Application Data

(63) Continuation of application No. 16/657,597, filed on Oct. 18, 2019, now Pat. No. 11,734,705.

(51) Int. Cl.
*G06Q 30/0201* (2023.01)
*G06N 3/08* (2023.01)
*G06Q 20/08* (2012.01)
*G06Q 20/10* (2012.01)
*G06Q 30/0204* (2023.01)

(52) U.S. Cl.
CPC .......... *G06Q 30/0206* (2013.01); *G06N 3/08* (2013.01); *G06Q 20/0855* (2013.01); *G06Q 20/102* (2013.01); *G06Q 30/0205* (2013.01)

(58) Field of Classification Search
CPC ... G06Q 40/02; G06Q 20/102; G06Q 30/0206
See application file for complete search history.

(56) References Cited

U.S. PATENT DOCUMENTS

| | | | |
|---|---|---|---|
| 8,346,568 B1 * | 1/2013 | Del Favero | G06Q 40/00 705/1.1 |
| 10,073,426 B1 * | 9/2018 | Davis, II | G06Q 30/04 |
| 11,151,669 B1 * | 10/2021 | Hailey | G06Q 40/03 |
| 2010/0306032 A1 * | 12/2010 | Jolley | G06Q 30/02 705/7.29 |
| 2014/0316974 A1 * | 10/2014 | Clark, II | G06Q 50/16 705/38 |

* cited by examiner

Primary Examiner — Eric T Wong
(74) Attorney, Agent, or Firm — KDW FIRM, PLLC (57) ABSTRACT

Various embodiments are generally directed to techniques utilizing computers to process service billing data, generate one or more groups of customers based on one or more attributes of the data, and train a recurrent neural network (RNN) to predict future bill amounts for customers. Embodiments further include techniques to predict the future bill amounts of the customers and providing an indication of the bill amounts to the customers.

20 Claims, 8 Drawing Sheets

RECEIVE SERVICE BILLING DATA FOR A PLURALITY OF CUSTOMERS, THE SERVICE BILLING DATA COMPRISING BILL INFORMATION, LOCATION INFORMATION, AND SERVICE TYPE INFORMATION FOR EACH OF THE PLURALITY OF CUSTOMERS
605

PERFORM A CLUSTER OPERATION ON THE SERVICE BILLING DATA TO GROUP THE PLURALITY OF CUSTOMERS INTO TWO OR MORE GROUPS OF CUSTOMERS, THE CLUSTER OPERATION TO GROUP THE PLURALITY OF CUSTOMERS BASED ON THE LOCATION INFORMATION AND THE SERVICE TYPE INFORMATION ASSOCIATED WITH EACH OF THE PLURALITY OF CUSTOMERS
610

TRAIN, FOR A CUSTOMER OF A GROUP OF CUSTOMERS, A RECURRENT NEURAL NETWORK (RNN) WITH BILL INFORMATION FOR A PREVIOUS TWELVE-MONTH PERIOD OF TIME, THE RNN TRAINED TO PREDICT BILL INFORMATION FOR A FUTURE TWELVE-MONTH PERIOD OF TIME FOR THE CUSTOMER OF THE GROUP OF CUSTOMERS
615

PREDICT WITH THE RNN AMORTIZED BILL AMOUNTS FOR THE CUSTOMER OF THE GROUP OF CUSTOMERS FOR THE FUTURE TWELVE-MONTH PERIOD OF TIME
620

CAUSE COMMUNICATION, VIA THE COMMUNICATION INTERFACE, OF AN INDICATION OF AN AMORTIZED BILL AMOUNT TO A DEVICE ASSOCIATED WITH THE CUSTOMER OF THE GROUP OF CUSTOMERS
625

TECHNIQUES TO PREDICT AND IMPLEMENT AN AMORTIZED BILL PAYMENT SYSTEM

CROSS-REFERENCE TO RELATED APPLICATIONS

This application is a continuation of U.S. patent application Ser. No. 16/657,597, filed Oct. 18, 2019, the entirety of which is incorporated herein by reference.

BACKGROUND

Often, consumers desire to perform budget planning to determine their costs for a given period so that they know how much they have to spend on necessities and how much is left over for discretionary spending. It is often very important for consumers to determine, well in advance, what bills they are likely to be responsible for, and any fluctuations that may occur in recurring bills over a period of time so that they can plan for large budget items, such as vacations, vehicles, entertainment devices, and so forth. Thus, accurately predicting future expenses is an important goal so that customers can perform budget planning.

SUMMARY

Various embodiments described herein may include one or more devices, apparatuses, systems, components, and so forth to perform the operations of receiving and processing service billing data for a plurality of customers, the service billing data includes bill information, location information, and service type information for each of the plurality of customers. Embodiments include performing a cluster operation on the service billing data to group the plurality of customers into two or more groups of customers, the cluster operation to group the plurality of customers based on the location information and the service type information associated with each of the plurality of customers, training, for a customer of a group of customers, a recurrent neural network (RNN) with bill information for a previous twelve-month period of time, the RNN trained to predict bill information for a future twelve-month period of time for the customer of the group of customer, and predict with the RNN amortized bill amounts for the customer of the group of customers for the future twelve-month period of time. Embodiments further include causing communication, via the communication interface, of an indication of an amortized bill amount to a device associated with the customer of the group of customers.

Embodiments also include a computer-readable storage medium or storage device capable of storing computer-readable program code executable by a processor to determine service billing data for a plurality of customers, the service billing data comprising bill information, location information, and service type information for each of the plurality of customers, cluster the plurality of customers based on the service billing data to generate groups of customers, each of the groups clustered based on the location information and the service type information associated with each of the plurality of customers, and train, for each customer of a group of customers, a recurrent neural network (RNN) with bill information for a previous period of time, each of the RNNs trained to predict bill information for a future period of time for corresponding customer of the group of customers. Embodiments also include predicting with an RNN a total amortized bill amount for a customer of the group of customers for the future period of time and sending an indication of the total amortized bill amount to a device associated with the customer of the group of customers.

Embodiments include a computer-implemented method including receiving, via a communication interface, service billing data for a plurality of customers, the service billing data comprising bill information, location information, and service type information for each of the plurality of customers, generating two or more clusters of customers from the plurality of customers by performing a cluster operation, the cluster operation to cluster the plurality of customers based on the location information and the service type information associated with each of the plurality of customers, training a recurrent neural network (RNN) with bill information for a previous twelve-month period of time, the RNN trained to predict bill information for a future twelve-month period of time for a customer of a cluster of customers, and predicting with the RNN amortized bill amounts for the customer of the cluster of customers for the future twelve-month period of time. The method also includes communicating, via the communication interface, an indication of an amortized bill amount to a device associated with the customer of the cluster of customers.

DETAILED DESCRIPTION

Various embodiments are generally directed to techniques to utilize machine-learning techniques to predict bill amounts for services to be provided in the future. For example, embodiments include collecting and determine historical data for customers for previous services provided. The service billing data including bill information indicating amounts of pervious bills for services, location information indicating locations for services provided, and service type information indicating the type of service provided.

In embodiments, machine-learning techniques described herein may include pre-processing the data prior to training models and predicting future bill amounts. For example, embodiments may include applying clustering techniques to generate clusters or groups of customers based on one or more attributes, e.g., bill amounts, location of services, and/or type of service. Embodiments may further include performing one or more training operations on the data to train models that may be utilized to predict the future bill amounts. For example, embodiments may include training models or neural networks with the service billing data. Each RNN for a group of customers may be trained with data from all of the customers within their group of customers. The data may include information for a previous amount of time in the past, e.g., the past twelve months. Once trained with the historical service billing data, a model or neural network may be utilized to predict a next bill for a customer. The predicted bill amount may then be fed back into the model or neural network to predict another bill amount, and so on and in a recursive manner.

In embodiments, the model or neural network may be used for the customer to predict for a specified future period of time, e.g., the next twelve months. Further, the total predicted and/or the amortized bill amount for each month may be provided to the customer in advance. The customer may utilize the information to perform budgeting planning, as previously discussed. Embodiments discussed herein provided a significant technological advantage over prior systems because they enable the system to more accurately predict future bills for customers based on attributes of historical service billing data, e.g., bill amounts, location of services, and service types. These and other details will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

Figure 1A:
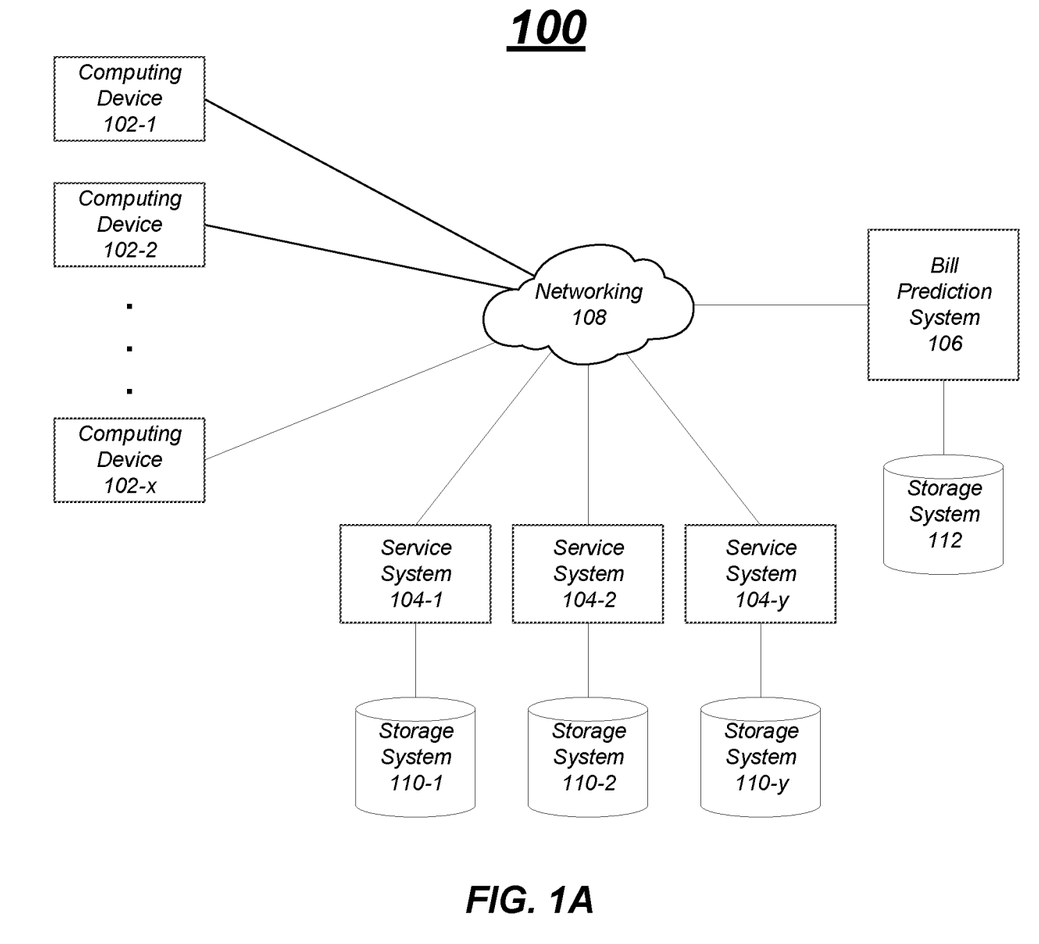
FIG. 1A/1B illustrates an example configuration of a system to determine payment amortization.

FIG. 1A illustrates an example of a computing system 100 to process information and data to predict future bills for services, e.g., utility services, entertainment services, maintenance services, etc. As will be discussed in more detail below, embodiments include processing data from service providers. The system 100 may further cluster the data into groups based on one or more attributes, e.g., location and service type and train one or more models or neural networks, such as recurrent neural networks (RNNs), to predict future bills for customers. The bills may be amortized over a period of time, e.g., one-year, such that a user may be able to anticipate their monthly bill amount for the entire year. These and other details will become more apparent in the following description.

In the illustrated example, the system 100 includes one or more computing devices 102-$x$, where x may be any positive integer. A computing device 102 may be able to process information and data and communicate via one or more interfaces. For example, a computing device 102 may be capable of accessing networks including the Internet, websites, local area networks, etc., via one or more wireless and wired networking connections, e.g., networking 108. For example, a computing device 102 may access web-based content hosted on a website to access service account information, billing information, etc. In another example, a computing device 102 may access app-based content via an application communicating with one or more dedicated systems, e.g., a service system. However, embodiments are not limited to these examples.

In embodiments, a computing device 102 may be a device, such as a personal computer, a desktop computer, a laptop computer, a tablet computer, a server, an embedded computer, a netbook, a mobile device, a personal digital assistant, a handheld computer, a workstation, etc. Moreover, a computing device 102 may be any type of device capable of communicating with other devices including devices associated with a service system 104 and/or bill prediction system 106. As will be discussed in more detail in FIG. 1B, a computing device 102 may include one or more processors coupled with memory and storage. The memory and storage may store instructions that may be executed by the one or more processors to perform the operations discussed herein. For example, a computing device 102 may include applications including a web browser to enable a user of the computing device 102 to browse websites and service applications to interface with a service provider and system.

The system 100 includes one or more service systems 104-$y$, where y may be any positive integer. A service system 104 may be any type of computing system. For example, a service system 104 may include one or more servers having processors, memory, components, and controllers to perform the operations discussed herein. In instances, the service system 104 may be a cloud-based system where one or more resources, such as the processors, memory, and storage may be allocated on a need basis to perform operation discussed herein. In other instances, a service system 104 may include in-house or local computing where the resources are owned and operated by a corporation.

In embodiments, a service system 104 may communicate with one or more computing devices 102 via networking 108. For example, a service system 104 may communicate service account information, service billing information, other service information, etc. to computing devices 102. The information may be communicated via website-based communications, e.g., by a customer accessing a website through a web browser of the computing device 102, and/or app-based communications accessed by a customer utilizing an application executing on the computing device 102.

In embodiments, a service system 104 may also communicate information with respect to services provided and associated with the service system 104 to the bill prediction system 106 via networking 108. For example, the service system 104 may communicate service billing data for a plurality of customers to the bill prediction system 106. The service billing data may be communicated on a periodic or a semi-periodic basis to the bill prediction system 106. In other instances, the service system 104 may communicate the service billing data to the bill prediction system 106 on request, e.g., a request received from the bill prediction system 106.

In embodiments, the service billing data may include bill information, location information, and service type information for customers. The bill information may be historic bill information indicating one or more bill amounts for a specific service over a period of time, e.g., the previous six months, twelve-months, and/or since the beginning of providing the service to a particular customer. In embodiments, each bill amount for a customer may be an amount paid each month for the service, e.g., a monthly bill amount. For example, the bill information may indicate each bill amount for each customer over a twelve-month period (last year).

In embodiments, the service type information includes information to identify a service type, e.g., a service type identifier. The service type identifier may be any combination of alphanumeric characters that may be utilized to specify a specific service. For example, a utility service, such as electricity, may be identified by 'ELE'. Embodiments are not limited to this example.

In embodiments, the location information includes location identifiers to identify locations of customers and/or service provided. Each customer and/or service may be associated with a location identifier to identify the location. In embodiments, the location identifier may be an address, a zip code, a city, a county, a state, a service provider area, and so forth.

In embodiments, the service systems 104 may be coupled with a storage system 110. A storage system 110 may be any type of storage system to store data and include hard disk drives (HDDs), solid-state drives, optical storage devices, magnetic tape storage, nearline storage, and so forth. Moreover, the storage system 110 may include volatile and non-volatile storage. The storage system 110 may store data in a data structure, such as a database. In one example, a storage system 110 may include a database having the service billing data that may be written to and read from by a service system 104. For example, a service system 104 may write new service billing data for a customer into a database of a storage system 110. In another example, the service system 104 may read service billing data from the database of the storage system 110, e.g., to provide to the bill prediction system.

In embodiments, system 100 includes a bill prediction system 106 that may process information and data to predict bill amounts for customers of service providers based on historical and current bill amounts. The bill prediction system 106 is capable of communicating with computing devices 102 and service systems 104 via networking 108. The bill prediction system 106 may be any type of computing system. For example, the bill prediction system 106 may include one or more servers having processors, memory, components, and controllers to perform the operations discussed herein. In instances, the bill prediction system 106 may be a cloud-based system where one or more resources, such as the processors, memory, and storage may be allocated on a need basis to perform operations discussed herein. In other instances, the bill prediction system 106 may include in-house or local computing where the resources are owned and operated by a corporation.

In embodiments, the bill prediction system 106 may process the service billing data received from one or more service systems 104 to determine future bill amounts. For example, the bill prediction system 106 may perform clustering on service billing data to group customers into groups of customers and train RNNs with bill information for a period of time for at least one of the group of customers. Further, the bill prediction system 106 may predict, with an RNN, amortized bill amounts for customers of the group of customers for a future period of time. The bill prediction system 106 may also notify customers of the future bill amounts. For example, the bill prediction system 106 may cause communication of an indication of an amortized bill amount to a computing device 102 associated with a customer. These and other details will be explained in more detail with respect to FIG. 1B.

Figure 1B:
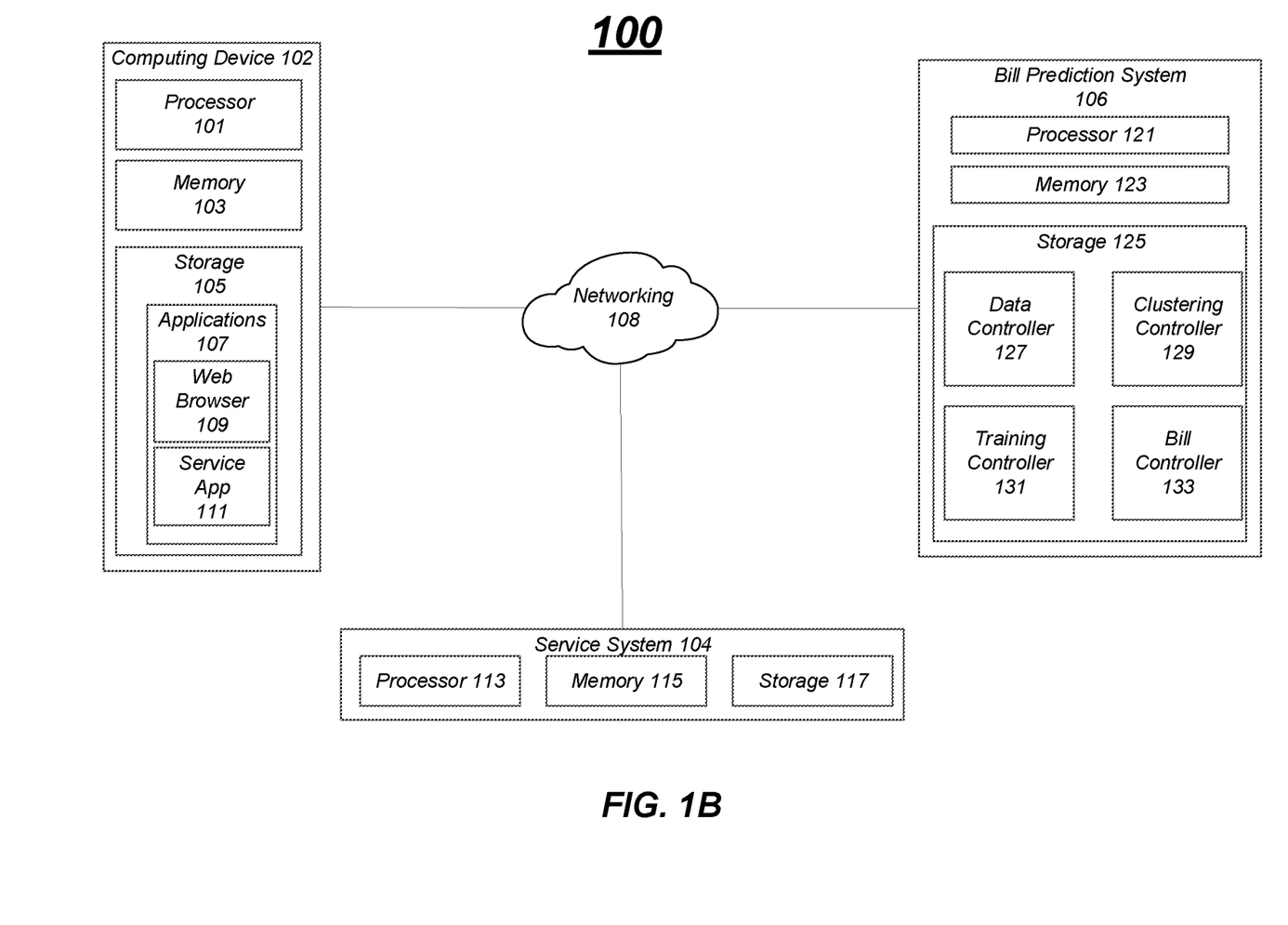

FIG. 1B illustrates a detailed view of system 100, computing device 102, and systems 104 and 106. In embodiments, the computing device 102 includes processor 101, memory 103, and storage 105. The processor 101 may include one or more processing cores to process information and data. Moreover, a processor 101 can include one or more processing devices, such as a microprocessor manufactured by Intel™, AMD™, or any of various processors. The disclosed embodiments are not limited to any type of processor(s).

Coupled with the processor 101, the computing device 102 may also include memory 103. The memory 103 can include one or more types of memory (volatile or non-volatile) devices configured to store instructions used by the one or more processors 101 to perform one or more operations consistent with the disclosed embodiments. For example, the memory 103 can be configured with one or more software instructions, such as programs and applications that can perform one or more operations when executed by the processor 101. In embodiments, the memory 103 may store instructions and data on a temporary basis as they are about to be processed by the processor 101.

In embodiments, the computing device 102 may further include a storage 105 coupled with the processor 101 and memory 103. The storage device 105 may include HDDs, flash memory devices, optical storage devices, floppy storage devices, etc. In some instances, the storage devices 105 may include cloud-based storage devices that may be accessed via a network interface. The storage device 105 may store one or more applications 107 that include instructions that may be executed by the processor 101.

In embodiments, one or more applications 107 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. The one or more applications may also include a web browser 109, such as Chrome®, Internet Explorer®, Safari®, Firefox®, and so forth. The web browser 109 may be utilized by a user or customer to surf or browse websites. Browsing websites may include causing the computing device 102 to communicate one or more messages with other devices via networking 108. These communications include requests and responses for a particular website, such as a service provider's website. In some instances, the web browser 109 may be used to access one or more accounts associated with a service provider of service system 104, for example. In another example, one or more applications 107 may include one or more service applications 111. A service application 111 includes instructions, that when executing, may enable the application to communicate with a service system 104.

In embodiments, a customer may utilize a web browser 109 and/or service application 111 to access information and data relating to a service provided by a service provider including billing information, account information, settings, etc. For example, a customer may utilize a web browser 109 and/or service application 111 to enable/disable services provided by a service provider, update/provide customer data associated with a service provider, receive and pay bills, etc.

In embodiments, the system 100 includes one or more service systems 104. A service system 104 may include one or more processors 113 coupled with memory 115, and storage 117. Although not shown, a service system 104 may also be coupled with a storage system 110 having one or more storage structures, as previously discussed.

In embodiments, a service system 104 may enable customers to interact and control one or more services provided by a service provider. As mentioned, the service system 104 may enable a customer to enable/disable a service or change a service level, change account settings, receive and pay bills associated with the service, etc. A service system 104 may be associated with any type of service, a utility service, an entertainment service, a maintenance service, etc. Examples of a utility service may include a water service, an electric service, a garbage service, a natural gas service, etc. Examples of an entertainment service may include an Internet service, a cable service, a streaming video service, etc. Examples of a maintenance service include a pest control service, a heating, ventilation, air condition (HVAC) service, an oil change service, etc. Embodiments are not limited to these examples and one or more services may be considered in different categories. In embodiments, the service system 104 may be operated by a service provider, such as a utility company providing utility services.

In embodiments, the processor(s) 113 can include any type of one or more processing devices, such as a microprocessor manufactured by Intel™, AMD™, or any of various processors. The memory 115, coupled with the one or more processors 113, can include volatile and/or non-volatile memory devices configured to store instructions used by the one or more processors 113 to perform one or more operations consistent with the disclosed embodiments. For example, memory 115 can be configured with one or more software instructions, such as programs and applications that can perform one or more operations when executed by the processor 113. In embodiments, the memory 115 may store instructions and data on a temporary basis as they are about to be processed by a processor 113.

In embodiments, the service system 104 may further include a storage device 117 coupled with the processors 113 and memory 115. The storage device 117 may include HDDs, flash memory devices, optical storage devices, floppy storage devices, etc. In some instances, a storage device 117 may include cloud-based storage devices that may be accessed via a network interface. The storage device 117 may store one or more applications and controllers that include instructions that may be executed by the processor 113 to perform the operations discussed herein.

In embodiments, the service system 104 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. The service system 104 includes one or more additional applications that enable customers to perform operations discussed herein, including enabling customers to changes settings with respect to service accounts and pay and manage bills.

In embodiments, the system 100 includes a bill prediction system 106 having a number of components and devices to perform the operations discussed herein. In embodiments, the bill prediction system 106 may include a number of servers in a server cluster or server farm architecture, for example. However, in other instances, bill prediction system 106 may be implemented in one server or computing device. The bill prediction system 106 includes one or more processors 121, memory 123, and storage 125. In embodiments, the processors 121 can include any type of one or more processing devices, such as a microprocessor manufactured by Intel™, AMD™, or any of various processors.

The memory 123, coupled with the one or more processor(s) 121, can include volatile and/or non-volatile memory devices configured to store instructions used by the one or more processors 121 to perform one or more operations consistent with the disclosed embodiments. For example, memory 123 can be configured with one or more software instructions, such as programs and applications that can perform one or more operations when executed by the processor 121. In embodiments, the memory 123 may store instructions and data on a temporary basis as they are about to be processed by the processor 121.

In embodiments, the bill prediction system 106 may further include a storage 125 coupled with the processors 121 and memory 123. The storage device 125 may include HDDs, flash memory devices, optical storage devices, floppy storage devices, etc. In some instances, the storage devices 125 may include cloud-based storage devices that may be accessed via a network interface. The storage device 125 may store one or more applications and controllers that include instructions that may be executed by the processor(s) 121 to perform the operations discussed herein. In some embodiments, the billing prediction system 106 may be coupled with a separate storage system 112 including a storage structure, such as a database, to store the service billing data received from a service system 104.

In embodiments, the bill prediction system 106 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. For example, the bill prediction system 106 may include a data controller 127, a clustering controller 129, a training controller 131, and a bill controller 133, and the operating system may enable one or more of the controllers to perform operations discussed herein.

In embodiments, the data controller 127 may be implemented in software only, hardware only, or a combination of software and hardware and embodiments are not limited in this manner. The data controller 127 includes instructions that when processed by a processor process the data associated with services provided, e.g. the service billing data.

Figure 2:
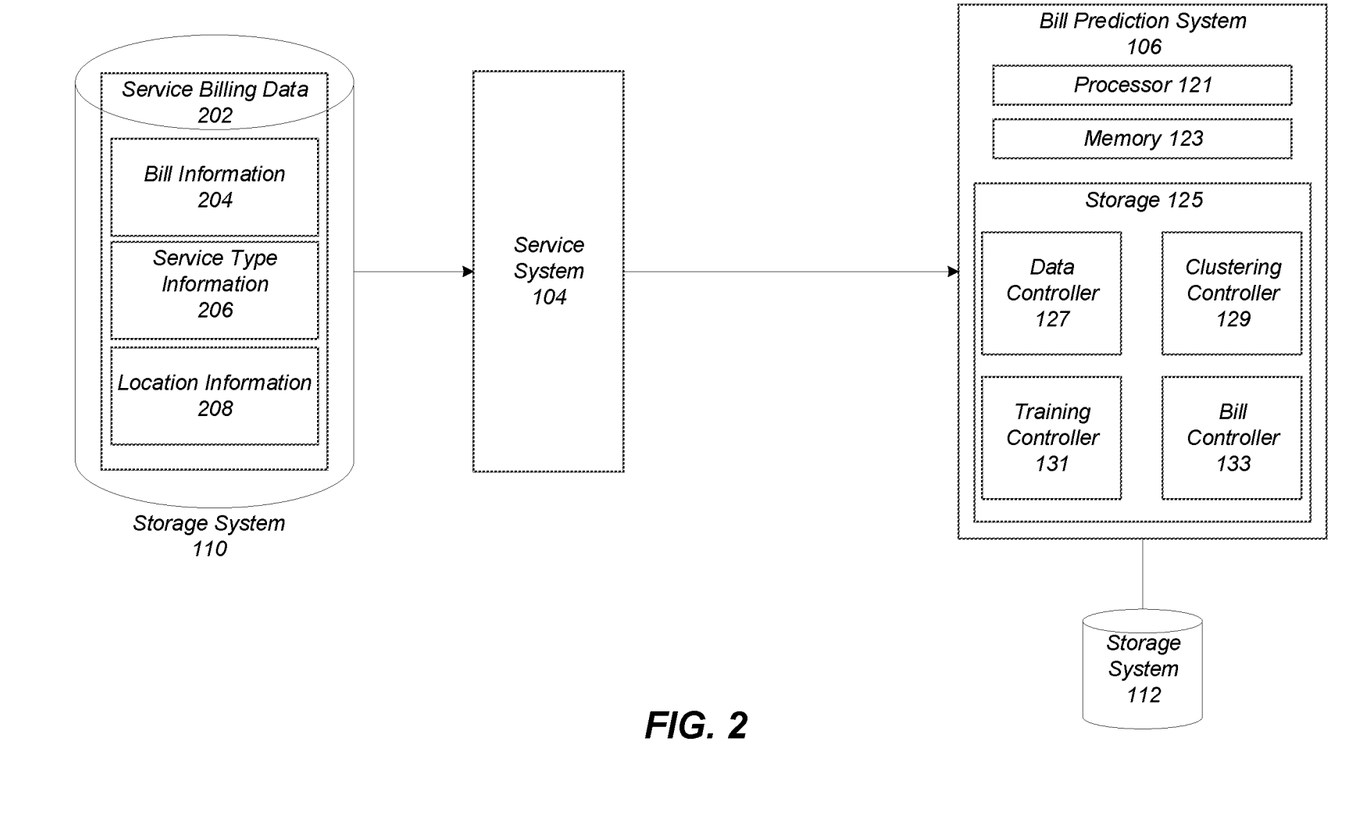
FIG. 2 illustrates an example of the system to determine data for payment amortization.

The data controller 127 may receive or retrieve data, such as the service billing data, from one or more service systems 104 for use to train one or more models and predict bill amounts. FIG. 2 illustrates a detailed view of a bill prediction system 106 including a data controller 127 receiving data from a service system 104. In embodiments, the service system 104 includes the service billing data 202 further including bill information 204, service type information 206, and location information 208 and stored in the storage system 110. In the illustrated example, the data controller 127 may receive service billing data 202 from a service system 104 via one or more networking connections, e.g., networking 108. Further, the service system 104 may send the service billing data 202 on a periodic or semi-periodic basis, e.g., monthly, to the bill prediction system 106 including the data controller 127. In other instances, the service system 104 may send the service billing data 202 to the data controller 104 when updated data is determined or generated by the service system 104 or the data controller 127 requests the service billing data 202.

In embodiments, the bill prediction system 106 including the data controller 127 may receive the service billing data 202 from a number of different service systems 104. In some instances, the service billing data 202 may be received in different formats from one of the one or more service system(s) 104, e.g., different address format, different bill amount format, different name format, etc. The data controller 127 may process the service billing data 202 and change/update the format of the service billing data 202 such that all of the data is formatted consistently and uniformly prior to training a model and predicting bills.

The data controller 127 may also perform one or more operations to secure data for customers when stored in storage, such as storage 112. For example, the data controller 127 may apply encryption to the data to ensure that the data is stored in an encrypted format. Any type of data encryption may be utilized, and embodiments are not limited to a specific encryption technique. The data controller 127 may also ensure that the data is communicated between the systems, e.g., the storage system 112 and/or service system 104, in a secure manner. For example, the data may be communicated using end-to-end encryption and use an encryption technique such as transport layer security (TLS). However, other security techniques may also be applied to the data.

In embodiments, the bill prediction system 106 may pre-process the service billing data for training a model. For example, the bill prediction system 106 may cluster the service billing information. With reference back to FIG. 1B, the bill prediction system 106 may include a clustering controller 129 to cluster the service billing data. The clustering controller 129 may apply a clustering technique to the service billing data to generate groups of customers (and associated data), for example. The groups may be groups of customers based and clustered on one or more attributes, such as the location of a customer and/or a service type provided to a customer.

The clustering controller 129 may retrieve service billing data from the storage system 112 and apply a clustering technique, such as the k-nearest neighbors (k-NN) grouping algorithm, where k represents k closest training examples in a feature space. The clustering controller 129 may apply the k-NN algorithm on the service billing data to generate two or more groups of customers, for example. The clustering controller 129, applying the k-NN algorithm, may determine which customers are in a group based on 'voting' of other customers of that group. For example, the clustering controller 129 may determine a vote based on the location information and/or the service type information associated with a customer. Thus, customers that are utilizing a same service type and/or in a relative same location are more likely to be in the same group.

Figure 3:
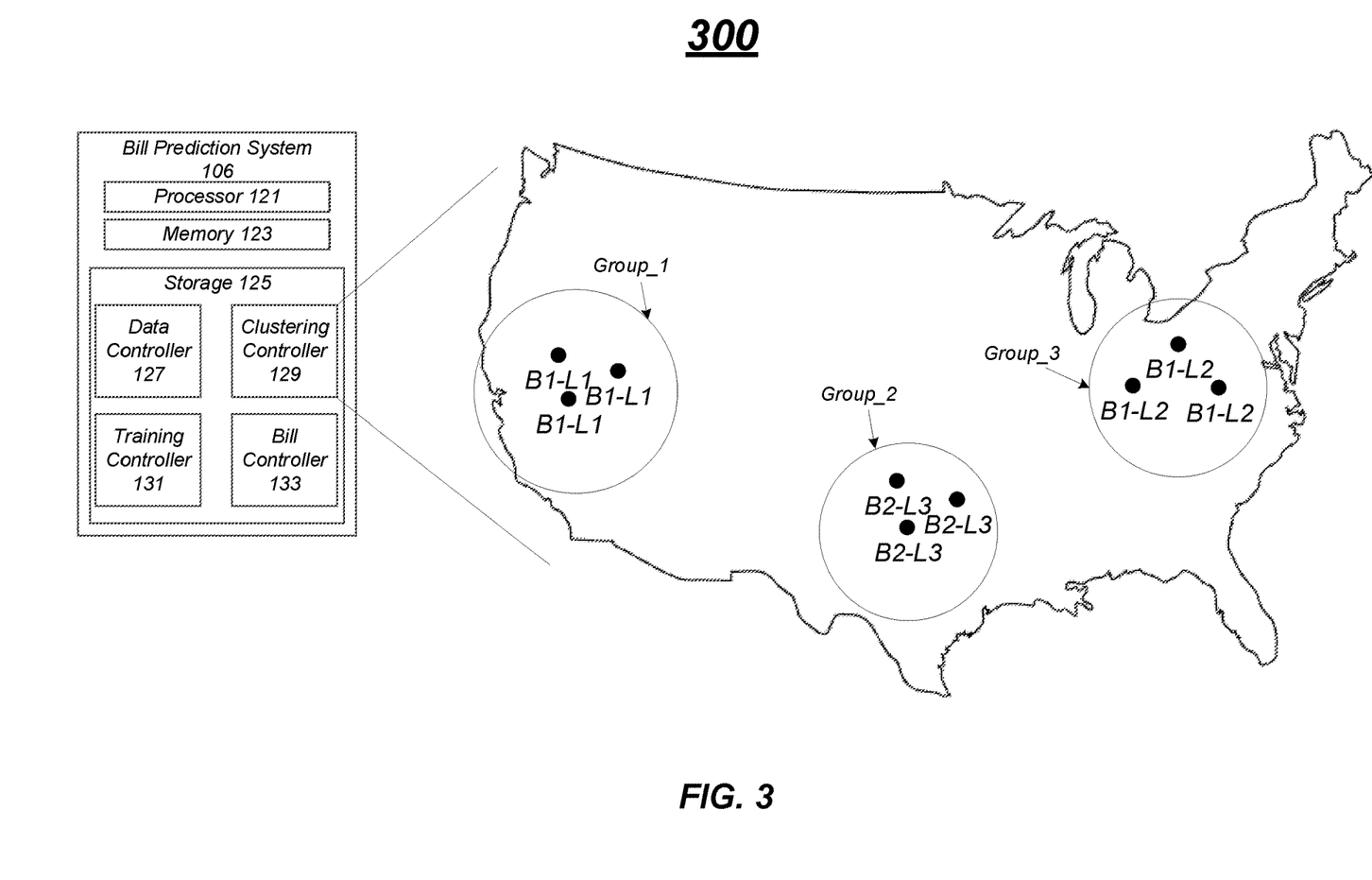
FIG. 3 illustrates an example of the system to perform clustering techniques for payment amortization.

FIG. 3 illustrates one example result of the clustering controller 129 utilizing the k-NN algorithm on a service billing data set. Note that FIG. 3 only illustrates a few groups generated based on the hypothetical service billing data set. Under real-world circumstances, the bill prediction system 106 may process tens of thousands, hundreds of thousands, or more data points and generate hundreds or thousands of groups. Embodiments are not limited in this manner.

In the illustrated example, the service billing data may include two different service types (B1 and B2) from three different locations (L1, L2, and L3). For example, B1 may correspond to electrical service and B2 may correspond to a streaming video service (e.g., NETFLIX®, AMAZON® PRIME®, HULU®, etc). Further L1 may correspond to the California, Utah, and Nevada area, L2 may correspond to the Ohio, Pennsylvania, and Indiana area, and L3 may correspond to the Texas and Oklahoma area. As mentioned, under a real data set, the location may be much more granular, e.g., down to the city or zip code, and may include many more than two service types. In embodiments, the number of groups or clusters that may be generated may be preconfigured, set by a user, set by an administrator, based on a number of customers, etc.

In the illustrated example, the clustering controller 129 generates three groupings based on service type and location. The illustrated example includes a first grouping "Group_1" includes three customers all in location L1 and having service type B1, the second group "Group_2" includes three customers all in location L2 and having service type B1, and the third group "Group_3" includes three customers all in location L3 and having service B2.

In embodiments, the clustering controller 129 may apply a different clustering algorithm and is not limited to utilizing a k-NN algorithm. Examples of other clustering algorithms may include a nearest centroid classifier or nearest prototype classifier that assigns to observations a label of a class (service type and/or location) of training samples whose mean (centroid) is closest to an observation. Other examples may include hashing schemes, such as locality sensitive hashing (LSH), where two points hash to the same bucket or group if they are close together. Embodiments are not limited to these examples.

In embodiments, the bill prediction system 106 may train and/or pretrain one or more models utilizing the service billing data to predict future bill amounts for customers. With reference back to FIG. 1B, the bill prediction system 106 includes a training controller 131 to generate one or more models with service billing data, which may include historic service billing data, bill amounts from a previous year. In one example, the service billing data corresponding to customers of one group of customers may be used to train recurrent neural networks (RNNs) for each of the customers in the group, each customer may be associated with a particular RNN. For example, the training controller 131 may use a previous twelve-months of bill amounts for the customers in the group to train RNNs. Each RNN, once trained, may be utilized to predict a next month's bill for each of the customers of the group associated with a particular RNN. The training controller 131 may then utilize the future predicted bills for the next month to feedback into and train or retrain the RNNs to predict a subsequent month's bill amounts for the customers. Thus, each customer's associated RNN may be retrained based on their own predicted bill amount. The updated RNNs may be used to determine or predict bill amounts for the month following the next month previously predicted amount, for example. This process may repeat to train or retrain the RNNs using each newly predicted monthly bill amounts feedback into each respective RNN until the entire next year's bill amounts are predicted for each customer.

Figure 4:
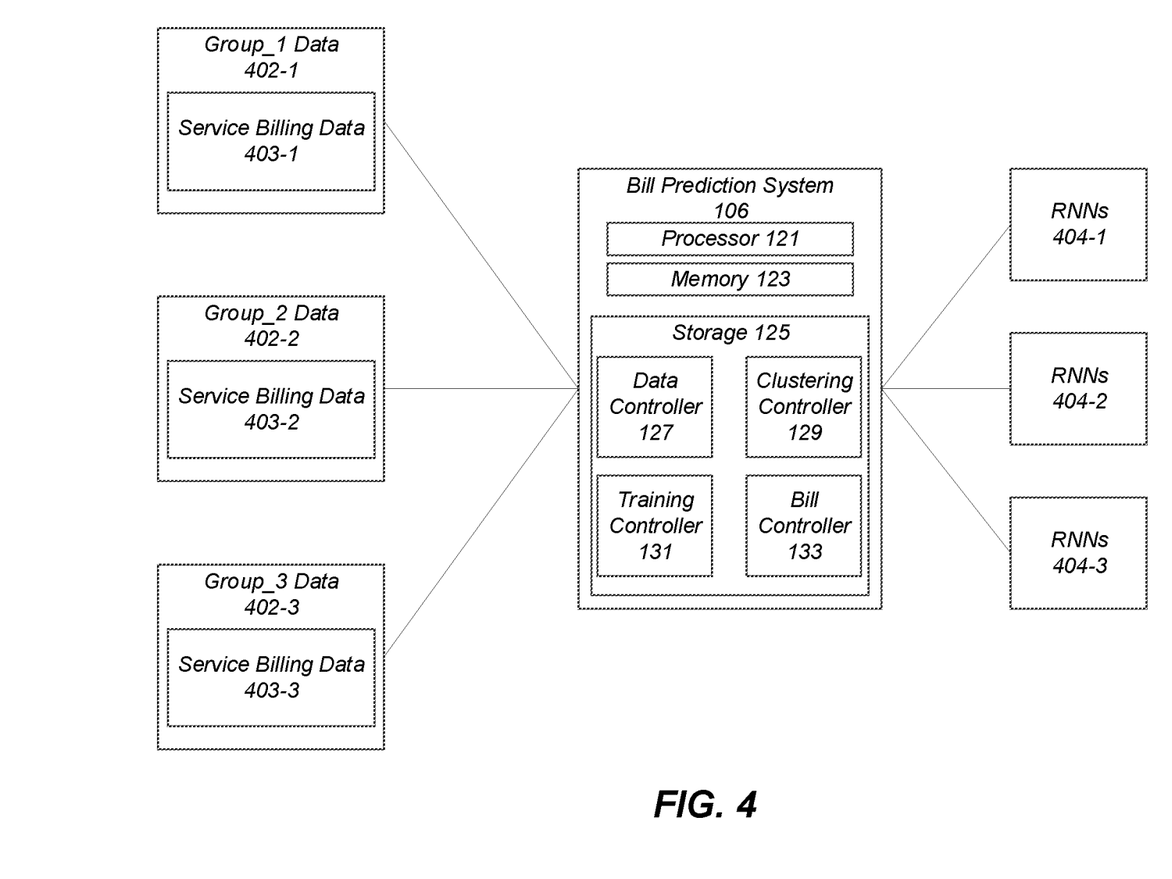
FIG. 4 illustrates an example of the system to perform modeling techniques for payment amortization.

FIG. 4 illustrates one example of the training controller 131 training RNNs for the groups of customers in FIG. 3. In this example, the bill prediction system 106 including the training controller 131 may generate three groupings of RNNs 404-1, 404-2, and 404-3. Each of the groups of RNNs may correspond to and be trained with service billing data associated with customers of in a group. Further, a specific RNN of a group RNNs may be associated with a specific customer. The service billing data 403-1 associated with customers of Group_1 402-1 may be utilized by the training controller 131 to train RNNs 404-1 and each customer of Group_1 may be associated with a particular RNN. Similarly, service billing data 403-2 and service billing data 403-3 may be utilized to train RNNs 404-2 and 404-3, respectively, by the training controller 131. Embodiments are not limited to this example and utilizing RNNs.

In some embodiments, the bill prediction system 106 includes a bill controller 133 that may predict amortized bill amounts for the customers. For example, the bill controller 133 may use an RNN associated with a customer to predict bill amounts for a future period of time, such as twelve months, for the customer. In this example, the RNN may be trained or pretrained via service billing data associated with the customers in the group of customers having the customer and then retrained with a predicted bill amount for the specific customer, as previously discussed. In embodiments, the bill controller 133 may predict the future bill amounts by using predicted bill amounts fed back into the RNN for the period of time, e.g., twelve-months.

In embodiments, the billing controller 133 may also notify each of the customers of their corresponding predicted bill amounts for their services. For example, the bill controller 133 may cause communication, via a communication interface (not shown), of an indication of a predicted bill amount to a customer's device, e.g., a computing device 102 associated with the customer. For example, the bill controller 133 may cause an email to be sent to an email address associated with the customer, send a text message to the device/phone number associated with the customer, provide the information on an account webpage of the customer, provide it to an app on a device of the customer, and so forth. In embodiments, the bill controller 133 may cause notification of predicted bill amounts for each of the customers associated with predicted bills. In some instances, the bill controller 133 may format a predicted bill amount prior to sending it to the customer. The bill controller 133 may generate an amortized bill amount, e.g., a monthly bill amount, based on the predicted bill amount for a period of time. If the predicted bill amount is $1200 for a twelve-month period of time, the bill controller 133 may generate an amortized bill amount of $100/month, for example. The bill controller 133 may communicate the amortized bill amount to the device associated with the customer.

In some instances, the bill prediction system 106 may apply a margin of error value to the bill amounts provided to the customers prior to providing them to the customer's devices. The margin of error may ensure or increase the likelihood that a customer will not have to pay an additional amount at the end of the predicted period of time, e.g., twelve-months, a catchup payment. the catchup payment may be the actual amount minus the predicted amount for the services provided over the period of time. To avoid this problem, some administrators and/or customers may determine they want to add a margin of error to the predicted bill amount. In some instances, the bill prediction system 106 may automatically apply a margin of error value, e.g. without an administrator and/or customer action.

In embodiments, the bill controller 133 may determine the margin of error amount to apply to a predicted bill amount. For example, the bill controller 133 may determine the accuracy of the modeling and prediction, e.g., 90% accurate, and determine the margin of error amount based on the accuracy. In this example, the margin of error amount may be 10% to cover the error in the accuracy of the model. However, in other instances, the be a predetermined based on another factor, e.g., inflation, expected changes in resources (energy fuel), weather and temperatures (hot/cold), service price trend (3% increase year-over-year), etc. and/or may be predetermined by an administrator and/or a particular customer.

The bill controller 133 may determine the margin of error amount and apply it to the predict bill amount for each of the customers. The bill controller 133 may communicate the adjusted amortized bill amounts to each of the customers. Further and as mentioned, the bill controller 133 may also track and determine the actual bill amount for the service provided for the period of time. The bill controller 133 may then determine a difference amount between the actual bill amount and a total amortized bill amount predicted for the period of time. The total amortized bill amount is the total of each monthly bill amount for the future twelve-month period of time, for example. The bill controller 133 may bill (catchup payment) or refund the customer the difference amount based on whether the actual bill amount is greater than or less than the total amortized bill amount. If the actual amount is more than the predicted, the bill controller 133 will generate a bill for the customer and if the actual amount is less than the predicted amount, the bill controller 133 will issue or cause issuance of a refund.

Figure 5:
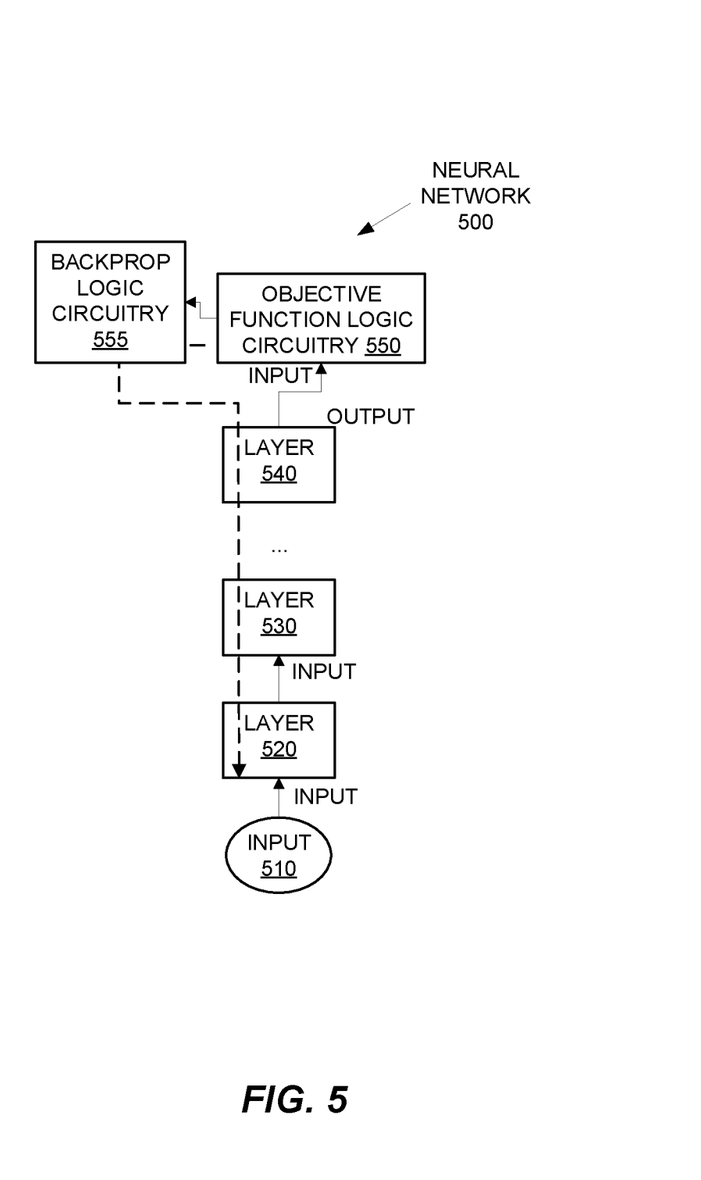
FIG. 5 illustrates an example of a processing flow performed by the system to perform model training.

FIG. 5 depicts an embodiment of stages of a neural network (NN) 500 such as an RNN. An RNN is a class of artificial neural network where connections between nodes form a directed graph along a sequence. This allows the RNN to exhibit dynamic temporal behavior for a time sequence. RNNs can use their internal state (memory) to process sequences of inputs and can have a finite impulse structure or an infinite impulse structure. A finite impulse recurrent network is a directed acyclic graph that can be unrolled and replaced with a strictly feedforward neural network, while an infinite impulse recurrent network is a directed cyclic graph that cannot be unrolled. A feedforward neural network is a neural network in which the output of each layer is the input of a subsequent layer in the neural network rather than having a recursive loop at each layer.

The neural network 500 comprises an input layer 510, and three or more layers 520 and 530 through 540. The input layer 510 may comprise input data that is training data, e.g., service billing data, for the neural network 500 or new service billing data to evaluate. The input layer 510 may provide the service billing data in the form of tensor data to the layer 520. As mentioned, the service billing data may include bill information, location information, and/or service type information.

In many embodiments, the input layer 510 is not modified by backpropagation. The layer 520 may compute an output and pass the output to the layer 1530. Layer 530 may determine an output based on the input from layer 520 and pass the output to the next layer and so on until the layer 540 receives the output of the second to last layer in the neural network 1500.

The layer 540 may generate an output and pass the output to an objective function logic circuitry 550. The objective function logic circuitry 550 may determine errors in the output from the layer 540 based on an objective function such as a comparison of the expected output against the actual output. For instance, the expected output may be paired with the input in the training data supplied for the neural network 500 for supervised training. In the present embodiment, during training, the output of the objective function logic circuitry 550 should be less than a deviation threshold because the training data is known to represent bill amounts for services.

During the training mode, the objective function logic circuitry 550 may output errors to backpropagation logic circuitry 555 to backpropagate the errors through the neural network 500. For instance, the objective function logic circuitry 550 may output the errors in the form of a gradient of the objective function with respect to the parameters of the neural network 500.

The backpropagation logic circuitry 555 may propagate the gradient of the objective function from the top-most layer, layer 540, to the bottom-most layer, layer 520 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives off and g. After the objective function logic circuitry 550 computes the errors, backpropagation logic circuitry 555 backpropagates the errors. The backpropagation is illustrated with the dashed arrows.

Figure 6:
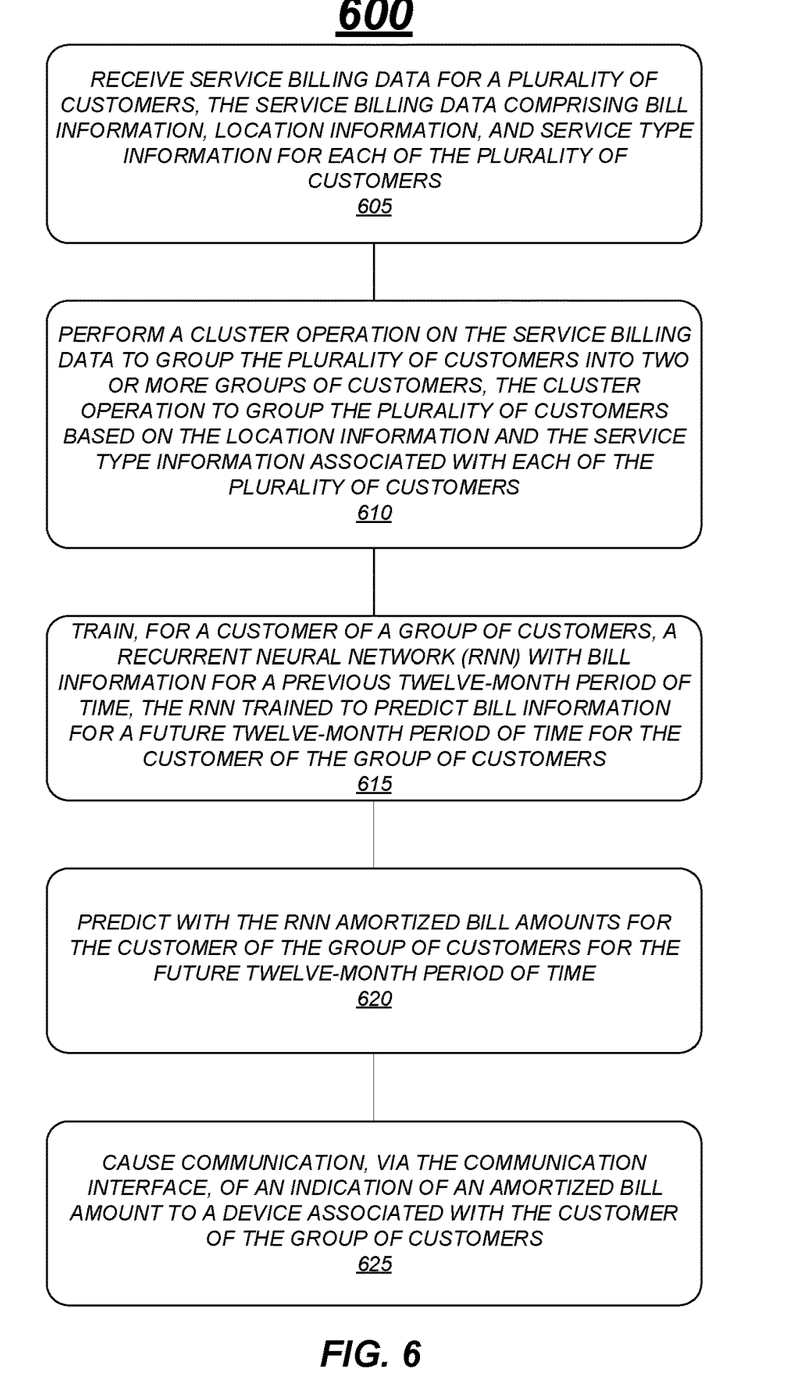
FIG. 6 illustrates a first example of a logic flow diagram.

FIG. 6 illustrates an example of a first logic flow 600 to predict service bill amounts for future services provided. FIG. 6 illustrates an example of a logic flow 600 that may be representative of some or all of the operations executed by one or more embodiments described herein.

At block 605, the logic flow 600 includes receiving service billing data for a plurality of customers. In embodiments, the service billing data includes bill information, location information, and service type information for each of the plurality of customers. In one example, the service billing data may be received by a bill prediction system and from one or more systems associated with service providers. Note that embodiments are not limited to predicting for a single service type from a single service provider.

At block 610, the logic flow 600 includes performing a cluster operation on the service billing data to group the plurality of customers into two or more groups of customers. The cluster operation may group the plurality of customers based on the location information and the service type information associated with each of the plurality of customers, for example. At block 615, the logic flow 600 includes training a RNN for a customer of a group of customers with bill information for a previous period of time, e.g., a previous twelve-month period. The RNN may be trained to predict bill information for a future twelve-month period of time for a customer of the group of customers.

In embodiments and at block 620, the logic flow 600 includes predicting with the RNN amortized bill amounts for the customer of the group of customers for the future period of time. Further and at block 625, the logic flow 600 includes causing communication of an indication of an amortized bill amount to a device associated with a customer of the group of customers.

Figure 7:
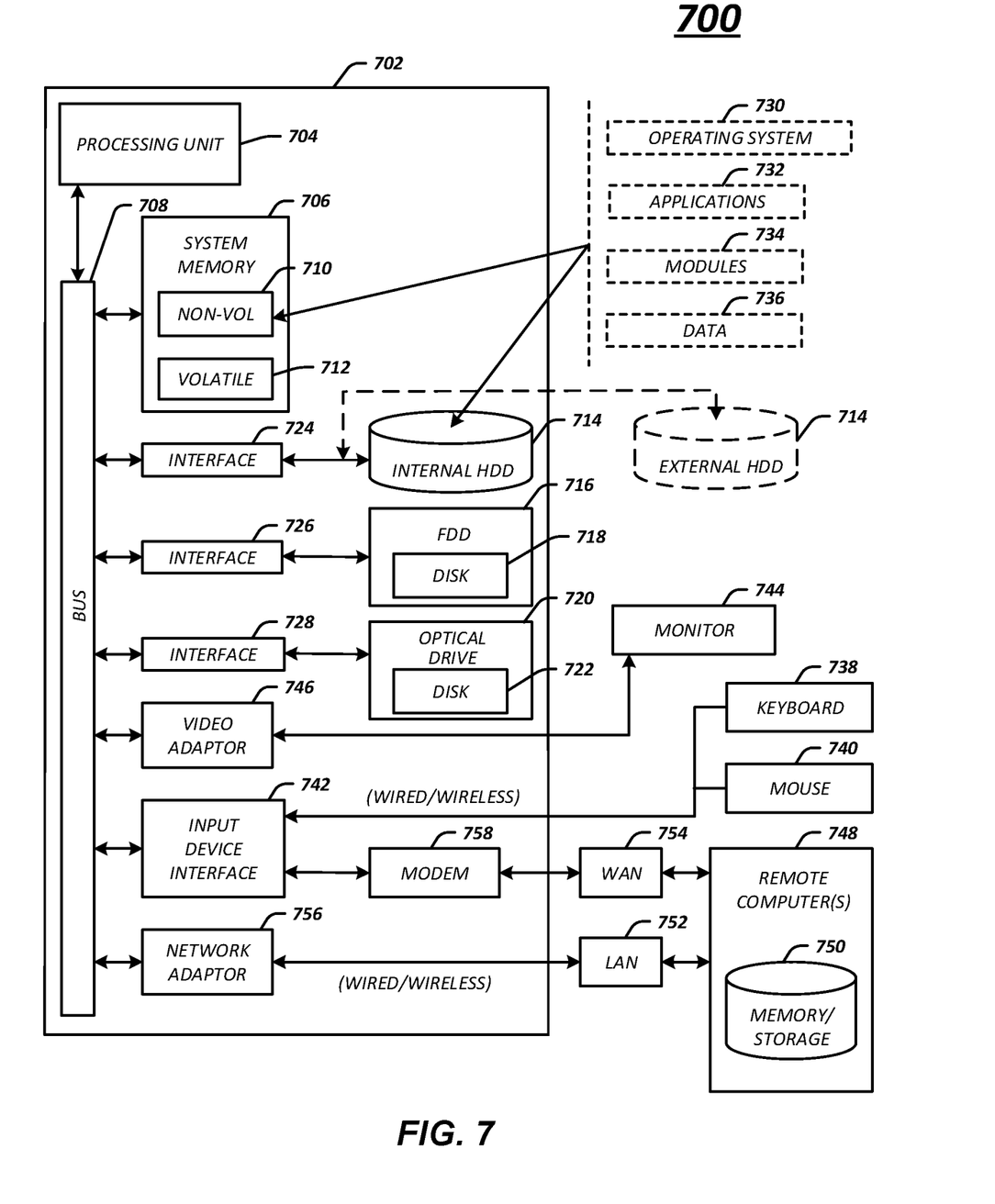
FIG. 7 illustrates an example of a system architecture.

FIG. 7 illustrates an embodiment of an exemplary computing architecture 700 that may be suitable for implementing an apparatus, system, and/or method for performing operations associated with the implementation of one or more of the disclosed techniques. In various embodiments, the computing architecture 700 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704. In some embodiments, processing circuitry of processing unit 704 and/or other processing circuitry of computing architecture 700 may be operative to perform operations associated with logic flow 500 and/or logic flow 600, and/or other operations associated with implementation of one or more of the disclosed techniques. In some embodiments, such processing circuitry may be coupled to a network interface of computing architecture 700.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a communication interface;
a processor circuit coupled with the communication interface; and
a memory coupled with the processor circuit and the communication interface, the memory storing instructions which when executed by the processor circuit, cause the processor circuit to:
receive, via the communication interface coupled with the processor circuit, service billing data for a plurality of customers, the service billing data comprising a plurality of attributes for each of the plurality of customers;
identify a group of customers based on a cluster operation using at least two attributes of the plurality of attributes;
predict, with a plurality of recurrent neural networks (RNNs), predicted periodic bill amounts for a future period of time for the group of customers, the prediction based on bill information for the group of customers received during a predetermined duration, wherein each of the RNNs is associated with a particular customer in the group of customers and trained with particular bill information for the particular customer to predict periodic bill amounts for the future period of time for the particular customer;
retrain each of the plurality of RNNs with the predicted periodic bill amounts for the future period of time from all of the plurality of customers;
predict, for the particular customer with an associated RNN, the periodic bill amounts for the future period of time, wherein the associated RNN is trained with the bill information for the particular customer and retrained with the predicted periodic bill amounts for the plurality of customers; and
display the periodic bill amounts for the future period of time for the particular customer.

2. The apparatus of claim 1, wherein the bill information comprises amounts of bills for a specific service over the predetermined duration for each of the plurality of customers, and wherein each of the amounts of bills is a periodic bill amount for a specific service.

3. The apparatus of claim 1, wherein the plurality of attributes comprises service type information, which comprises a service type identifier to identify a service type of a specific service.

4. The apparatus of claim 1, wherein the plurality of attributes comprises location information, which comprises location identifiers to identify locations of the plurality of customers, each customer of the plurality of customers associated with a location identifier to identify a location.

5. The apparatus of claim 1, wherein the cluster operation comprises applying a k-nearest neighbors (k-NN) algorithm on the service billing data to generate two or more groups of customers.

6. The apparatus of claim 5, wherein the k-NN algorithm to determine the customer of the plurality of customers to include in the group of customers of the two or more groups of customers based on voting of other customers of the group of customers.

7. The apparatus of claim 6, wherein the voting of the group of customers is based on location information and service type information associated with each of the other customers of the group of customers.

8. The apparatus of claim 1, wherein the instructions which when executed by the processor circuit, further cause the processor circuit to determine a margin of error amount for an amortized bill amount for the particular customer and adjust the amortized bill amount by the margin of error amount prior to the display.

9. The apparatus of claim 1, wherein the instructions which when executed by the processor circuit, further cause the processor circuit to:
determine an actual bill amount for a specific service provided for the future period of time for the particular customer;
determine a difference amount between the actual bill amount and a total amortized bill amount for the future period of time for the particular customer, wherein the total amortized bill amount is the total of the periodic bill amounts predicted for the particular customer for the future period of time; and
bill or refund the customer the difference amount based on whether the actual bill amount is greater than or less than the total amortized bill amount.

10. A method comprising:
receiving, by a computer server, service billing data for a plurality of customers, the service billing data comprising a plurality of attributes for each of the plurality of customers;
identifying, by the computer server, a group of customers based on a cluster operation using at least two attributes of the plurality of attributes;
predicting, by the computer server, with a plurality of recurrent neural networks (RNNs), predicted periodic bill amounts for a future period of time for the group of customers, the prediction based on bill information for the group of customers received during a predetermined duration, wherein each of the RNNs is associated with a particular customer in the group of customers and trained with particular bill information for the particular customer to predict periodic bill amounts for the future period of time for the particular customer;

retraining, by the computer server, each of the plurality of RNNs with the predicted periodic bill amounts for the future period of time from all of the plurality of customers;

predicting, by the computer server, for the particular customer with an associated RNN, the periodic bill amounts for the future period of time, wherein the associated RNN is trained with the bill information for the particular customer and retrained with the predicted periodic bill amounts for the plurality of customers; and causing, by the computer server, the periodic bill amounts to be displayed for the future period of time for the particular customer.

11. The method of claim 10, wherein the bill information comprises amounts of bills for a specific service over the predetermined duration for each of the plurality of customers, and wherein each of the amounts of bills is a periodic bill amount for a specific service.

12. The method of claim 10, wherein the plurality of attributes comprises service type information, which comprises a service type identifier to identify a service type of a specific service.

13. The method of claim 10, wherein the plurality of attributes comprises location information, which comprises location identifiers to identify locations of the plurality of customers, each customer of the plurality of customers associated with a location identifier to identify a location.

14. The method of claim 10, wherein the cluster operation comprises applying a k-nearest neighbors (k-NN) algorithm on the service billing data to generate two or more groups of customers.

15. The method of claim 14, wherein the k-NN algorithm to determine the customer of the plurality of customers to include in the group of customers of the two or more groups of customers based on voting of other customers of the group of customers.

16. The method of claim 15, wherein the voting of the group of customers is based on location information and service type information associated with each of the other customers of the group of customers.

17. A non-transitory computer-readable storage medium, the computer-readable storage medium including instructions that when executed by a computer, cause the computer to:

receive service billing data for a plurality of customers, the service billing data comprising a plurality of attributes for each of the plurality of customers;

identify a group of customers based on a cluster operation using at least two attributes of the plurality of attributes;

predict with a plurality of recurrent neural networks (RNNs), predicted periodic bill amounts for a future period of time for the group of customers, the prediction based on bill information for the group of customers received during a predetermined duration, wherein each of the RNNs is associated with a particular customer in the group of customers and trained with particular bill information for the particular customer to predict periodic bill amounts for the future period of time for the particular customer;

retrain each of the plurality of RNNs with the predicted periodic bill amounts for the future period of time from all of the plurality of customers;

predict, for the particular customer with an associated RNN, the periodic bill amounts for the future period of time, wherein the associated RNN is trained with the bill information for the particular customer and retrained with the predicted periodic bill amounts for the plurality of customers; and display the periodic bill amounts for the future period of time for the particular customer.

18. The computer-readable storage medium of claim 17, wherein the bill information comprises amounts of bills for a specific service over the predetermined duration for each of the plurality of customers, and wherein each of the amounts of bills is a periodic bill amount for a specific service.

19. The computer-readable storage medium of claim 17, wherein the plurality of attributes comprises service type information, which comprises a service type identifier to identify a service type of a specific service.

20. The computer-readable storage medium of claim 17 further comprising instructions which when executed by the computer, cause the computer to determine a margin of error amount for an amortized bill amount for the particular customer and adjust the amortized bill amount by the margin of error amount prior to the display.

* * * * *